Jan. 23, 1968   B. J. LERNER   3,365,180
TOWER PACKING ELEMENTS
Filed Jan. 10, 1966

INVENTOR.
BERNARD J. LERNER
BY Hamilton & Cook
ATTORNEYS

United States Patent Office 3,365,180
Patented Jan. 23, 1968

3,365,180
TOWER PACKING ELEMENTS
Bernard J. Lerner, 727 Orchard Hill Drive,
Pittsburgh, Pa. 15238
Filed Jan. 10, 1966, Ser. No. 519,736
2 Claims. (Cl. 261—94)

ABSTRACT OF THE DISCLOSURE

A packing element used in a tubular tower, said element formed by compressing the ends of a relatively short cylindrical tube in a transverse and perpendicular manner so as to form elliptical open ends of said cylinder. The walls of said cylinder are then somewhat conically shaped and never in a position parallel to each other.

---

Figure 1:
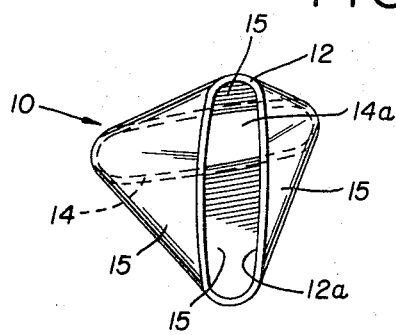

The present invention relates to packing elements for use in gas-liquid contacting towers. More particularly, the invention relates to tower packing elements, of ceramic material metal or plastic, having a shape and configuration which has heretofore not been known or utilized for use in packed towers.

In gas-liquid contacting devices such as packed towers, it is general practice to utilize a bed of packing elements. The packed bed provides an extended surface area for interphase contact and serves as the means for continuous dispersal and mixing of the fluid phases.

Presently available tower packing elements are usually regular geometrical or symmetrical shapes having one or more undesirable features when used in the form of a randomly-dumped bed. Most packing elements, by reason of geometry or symmetry, will tend to form at least a partially-ordered array even though randomly dumped. This tendency to "pattern-pack" gives rise to such undesirable bed characteristics as high pressure drop, non-uniform flow resistance or "channeling" behavior, and unequal radial dispersion of the fluid phases.

It is an object of this invention to provide a packing element which will form a bed without the above-noted deficiencies. Specifically, this invention provides a packing element of high mechanical strength which forms a completely randomized packed bed when dumped or poured into place, said bed having a high and uniform degree of radial deflection and dispersion, particularly for the liquid phase, and low pressure drop characteristics with reference to the gas phase. Additionally, a random bed laid with packing elements according to the invention possesses a high interfacial contact area per unit bed volume, a high degree of surface accessibility for both fluid phases, and high free volumetric flow space.

Presently available packing elements have planes or surfaces which are parallel, or whose surface shape may be considered as being generated by a straight line or curve which passes through one or more parallel positions during the generation of the shape, or which itself contains some parallel segments. For example, the Raschig ring is a cylinder having a height equal to its diameter, which is formed by a generating line which is at every point parallel to its original position. With packing elements having any degree of parallelism of planes, excluding the planes bounding the packing element walls, it is possible that one plane will shield or screen another parallel plane from access to the fluid streams. Therefore, it is a further object of the invention to provide a packing element having no planes which are parallel, and which therefore, regardless of orientation to fluid flow direction, will not allow one plane to completely screen or shield another from accessibility to the contacting fluid phases. An assembly of elements according to the invention, in a tower, provides a minimum of inter-element shielding with respect to fluid flow while obtaining maximum radial deflection and dispersion of the fluid phases.

Although the preferred form of packing element according to the invention has ends which are generally non-planar, it is possible by use of precise fabrication techniques, particularly with metal or plastic, to make the ends relatively flat and parallel providing a packing element which may be hand-stacked in a geometrically precise manner.

It is a further object of the invention to provide a packing element which possesses the unique property of imparting both divergence and convergence of flow to portions of the fluid streams impinging on the packing element, regardless of its orientation.

Referring to the drawings, FIG. 1 is a perspective view of a preferred form of tower packing element, indicated generally by the numeral 10.

Figure 4:
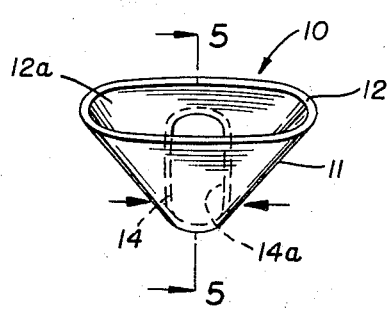
Figure 2:
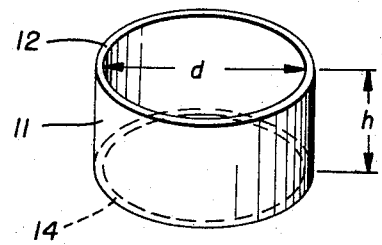
Figure 3:
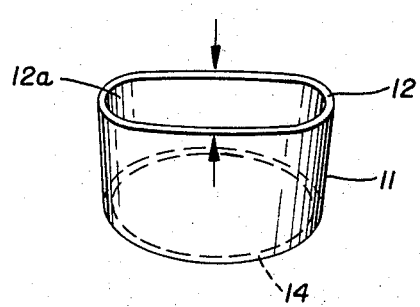

FIGS. 2–4 illustrate a sequence of fabrication techniques for making one form of tower packing element according to the invention with—

FIG. 2 showing a tube 11 having a diameter $d$ approximately twice its height $h$, with—

FIG. 3 showing one end 12 of the tube 11 pressed together, in the direction of the arrows, to form an elongated opening 12a, and with—

FIG. 4 showing the opposite end 14 of the tube 11 pressed together, in the direction of the arrows, to form an elongated opening 14a.

Figure 5:
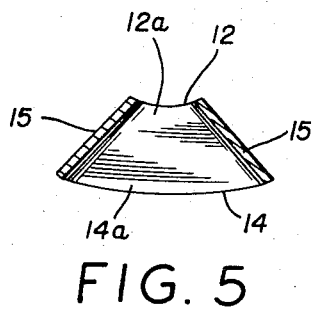

FIG. 5 is a view, taken as indicated by line 5—5 of FIG. 4, showing the opening 14a and two, of the four, solid merging walls 15 of a packing element 10.

Figure 6:
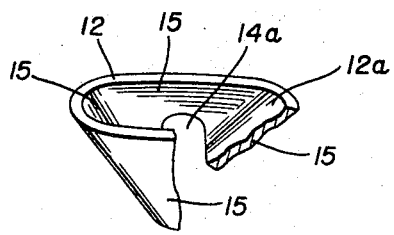

FIG. 6 is a fragmentary view, similar to FIG. 4, with a portion of the packing element 10 broken away to illustrate the inside surfaces of each tapered wall 15.

The packing element 10 has two ends, 12 and 14, with transversely elongated openings, 12a and 14a. The openings, 12a and 14a, are angularly disposed to each other. The element 10 has four solid merging tapered walls 15 connecting the ends 12 and 14. Each wall 15 is tapered in the oposite direction from the adjacent walls.

In the preferred form of the invention, the end openings, 12a and 14a, are generally ellipsoidal. When the packing element is formed from a cylinder, following the technique of FIGS. 2–4, the edge openings may be non-planar or slightly warped. This is an advantage for a random bed packing in that such openings are not readily blocked by other packing elements.

In the prefered form of the invention, the end openings, 12a and 14a, have orthogonal major axes, meaning that the openings are at right angles to each other. Further, as shown, the openings are coaxially disposed one to the other.

The four walls 15 of the packing element merge in a generally conical curve outward of the end openings. The four-sided packing element shape, having no sides in parallel planes, provides for deflection of any incident fluid stream in at least four different directions, independent of any orientation of the packing element with respect to the flow direction of the incident fluid.

What is claimed is:
1. A tubular tower packing element having transversely elongated and generally ellipsoidal open ends disposed at right angles and having solid merging tapered walls being generally conically curved outwardly and connecting said open ends.
2. A tubular tower packing element described in claim 1 of a ceramic material whereby a plurality of said elements in a packing tower will permit improved fluid flow imparting both divergence and convergence regardless of the position of said element within the tower.

(References on following page)

References Cited

UNITED STATES PATENTS

| | | | |
|---|---|---|---|
| 1,307,635 | 6/1919 | Nielsen | 261—95 |
| 1,503,208 | 7/1924 | Prym | 261—95 |
| 2,376,349 | 5/1945 | Frischer | 261—94 |
| 3,159,910 | 12/1964 | Lehmer et al. | 261—94 X |
| 3,233,660 | 2/1966 | Nettel et al. | 165—4 |

FOREIGN PATENTS

| | | |
|---|---|---|
| 501,196 | 6/1930 | Germany. |
| 431,309 | 7/1935 | Great Britain. |
| 445,045 | 4/1936 | Great Britain. |
| 94,680 | 5/1922 | Switzerland. |

HARRY B. THORNTON, *Primary Examiner.*

TIM R. MILES, *Assistant Examiner.*